(12) United States Patent
Chawla

(10) Patent No.: US 8,583,079 B2
(45) Date of Patent: Nov. 12, 2013

(54) RICH PRESENCE STATUS BASED ON LOCATION, ACTIVITY, AVAILABILITY AND TRANSIT STATUS OF A USER

(75) Inventor: Neeraj Chawla, Bothell, WA (US)

(73) Assignee: mPanion, Inc., Bothell, WA (US)

(*) Notice: Subject to any disclaimer, the term of this patent is extended or adjusted under 35 U.S.C. 154(b) by 148 days.

(21) Appl. No.: 13/069,380

(22) Filed: Mar. 22, 2011

(65) Prior Publication Data

US 2011/0183645 A1    Jul. 28, 2011

Related U.S. Application Data

(63) Continuation-in-part of application No. 12/728,216, filed on Mar. 20, 2010, which is a continuation-in-part of application No. 11/838,876, filed on Aug. 14, 2007, now Pat. No. 8,050,690.

(60) Provisional application No. 61/316,242, filed on Mar. 22, 2010.

(51) Int. Cl.
  *H04M 3/16* (2006.01)
(52) U.S. Cl.
  USPC .................... 455/410; 455/456.1; 340/426.19
(58) Field of Classification Search
  USPC ......... 455/456.2, 410, 573; 719/320; 709/204
  See application file for complete search history.

(56) References Cited

U.S. PATENT DOCUMENTS

| | | | |
|---|---|---|---|
| 6,055,513 A | 4/2000 | Katz et al. | |
| 6,057,872 A | 5/2000 | Candelore | |
| 6,101,484 A | 8/2000 | Halbert et al. | |
| 6,157,841 A | 12/2000 | Bolduc et al. | |
| 6,269,343 B1 | 7/2001 | Pallakoff | |
| 6,295,528 B1 | 9/2001 | Marcus et al. | |
| 6,381,303 B1 | 4/2002 | Vu et al. | |
| 6,385,458 B1 | 5/2002 | Papadimitriou et al. | |
| 6,400,956 B1 | 6/2002 | Richton | |
| 6,442,391 B1 | 8/2002 | Johansson et al. | |
| 6,442,530 B1 | 8/2002 | Miller | |
| 6,446,004 B1 | 9/2002 | Cao et al. | |

(Continued)

FOREIGN PATENT DOCUMENTS

| | | |
|---|---|---|
| EP | 1 418 784 A1 | 5/2004 |
| JP | 2002354522 A | 12/2002 |

(Continued)

OTHER PUBLICATIONS

International Search Report for PCT/US2008/072977 mailed Jan. 30, 2009 (corresponds with PCT application for U.S. Appl. No. 11/838,876).

(Continued)

*Primary Examiner* — Phuoc Doan

(74) *Attorney, Agent, or Firm* — LeonardPatel PC; Michael A. Leonard, II; Sheetal S. Patel

(57) ABSTRACT

A method and system for determining and sharing rich presence status of a user is presented. Multiple types of presence status options are associated with user's status based on location, activity, availability, transit status, and user's text updates, which the user can selectively share on their mobile device with different groups of users, and make one or more aspects of their presence status broadly available to everyone. Also a system to determine status based on auto-updates and manual updates is presented.

20 Claims, 9 Drawing Sheets

(56) References Cited

U.S. PATENT DOCUMENTS

| | | |
|---|---|---|
| 6,452,498 B2 | 9/2002 | Stewart |
| 6,505,123 B1 | 1/2003 | Root et al. |
| 6,542,820 B2 | 4/2003 | Lamance et al. |
| 6,556,975 B1 | 4/2003 | Wittsche |
| 6,560,534 B2 | 5/2003 | Abraham et al. |
| 6,587,835 B1 | 7/2003 | Treyz et al. |
| 6,611,751 B2 | 8/2003 | Warren |
| 6,631,404 B1 | 10/2003 | Philyaw |
| 6,647,257 B2 | 11/2003 | Owensby |
| 6,651,000 B2 | 11/2003 | Van Diggelen et al. |
| 6,668,167 B2 | 12/2003 | McDowell et al. |
| 6,754,585 B2 | 6/2004 | Root et al. |
| 6,756,882 B2 | 6/2004 | Benes et al. |
| 6,756,917 B2 | 6/2004 | Gould et al. |
| 6,760,046 B2 | 7/2004 | I'Anson et al. |
| 6,760,601 B1 | 7/2004 | Suoknuuti et al. |
| 6,763,299 B2 | 7/2004 | Jones |
| 6,763,300 B2 | 7/2004 | Jones |
| 6,764,003 B1 | 7/2004 | Martschitsch et al. |
| 6,826,617 B1 | 11/2004 | Ansell et al. |
| 6,829,535 B2 | 12/2004 | Van Diggelen et al. |
| 6,836,730 B2 | 12/2004 | Root et al. |
| 6,839,554 B2 | 1/2005 | McDowell et al. |
| 6,850,837 B2 | 2/2005 | Paulauskas et al. |
| 6,868,396 B2 | 3/2005 | Smith et al. |
| 6,871,140 B1 | 3/2005 | Florance et al. |
| 6,873,997 B1 | 3/2005 | Majjasie et al. |
| 6,912,398 B1 | 6/2005 | Domnitz |
| 6,912,517 B2 | 6/2005 | Agnihotri et al. |
| 6,931,254 B1 | 8/2005 | Egner et al. |
| 6,937,998 B1 | 8/2005 | Swartz et al. |
| 6,944,467 B2 | 9/2005 | Ala-Luukko |
| 6,944,679 B2 | 9/2005 | Parupudi et al. |
| 6,947,976 B1 | 9/2005 | Devitt et al. |
| 6,954,633 B1 | 10/2005 | Metternich et al. |
| 6,954,697 B1 | 10/2005 | Smith |
| 6,957,393 B2 | 10/2005 | Fano et al. |
| 6,965,868 B1 | 11/2005 | Bednarek |
| 6,965,872 B1 | 11/2005 | Grdina |
| 6,973,322 B2 | 12/2005 | Buchmann et al. |
| 6,973,438 B1 | 12/2005 | Philyaw |
| 6,975,872 B2 | 12/2005 | Cheng |
| 6,983,146 B2 | 1/2006 | Spratt |
| 6,985,813 B2 | 1/2006 | Root et al. |
| 6,988,037 B2 | 1/2006 | Root et al. |
| 6,992,617 B2 | 1/2006 | Diggelen et al. |
| 6,996,579 B2 | 2/2006 | Leung et al. |
| 7,071,842 B1 | 7/2006 | Brady, Jr. |
| 7,092,964 B1 | 8/2006 | Dougherty et al. |
| 7,116,985 B2 | 10/2006 | Wilson et al. |
| 7,206,568 B2 | 4/2007 | Sudit |
| 7,219,303 B2 | 5/2007 | Fish |
| 7,224,978 B2 | 5/2007 | Zellner et al. |
| 7,224,987 B1 | 5/2007 | Bhela et al. |
| 7,236,799 B2 | 6/2007 | Wilson et al. |
| 7,237,201 B2 | 6/2007 | Fish |
| 7,242,946 B2 | 7/2007 | Kokkonen et al. |
| 7,245,925 B2 | 7/2007 | Zellner |
| 7,266,443 B2 | 9/2007 | Hirose |
| 7,315,259 B2 | 1/2008 | Sacks |
| 7,352,322 B2 | 4/2008 | Tsujimoto et al. |
| 7,412,400 B1 | 8/2008 | Bhela et al. |
| 7,417,544 B2 | 8/2008 | Artem et al. |
| 7,418,267 B2 | 8/2008 | Karaoguz |
| 7,418,451 B2 | 8/2008 | Leung et al. |
| 7,418,503 B2 | 8/2008 | Zellner et al. |
| 7,426,436 B1 | 9/2008 | Van Watermulen et al. |
| 7,589,628 B1 | 9/2009 | Brady, Jr. |
| 7,628,704 B1 | 12/2009 | Uhlir et al. |
| 8,070,608 B2 | 12/2011 | Uhlir et al. |
| 8,126,889 B2 | 2/2012 | Pitt |
| 2002/0002504 A1 | 1/2002 | Engel et al. |
| 2002/0035605 A1 | 3/2002 | McDowell et al. |
| 2002/0065111 A1 | 5/2002 | Otsuka et al. |
| 2002/0067308 A1 | 6/2002 | Robertson |
| 2002/0077130 A1 | 6/2002 | Owensby |
| 2002/0091568 A1 | 7/2002 | Kraft et al. |
| 2002/0102993 A1 | 8/2002 | Hendrey et al. |
| 2002/0111172 A1 | 8/2002 | DeWolf et al. |
| 2002/0188589 A1 | 12/2002 | Salmenkaita et al. |
| 2003/0055983 A1 | 3/2003 | Callegari |
| 2003/0060214 A1 | 3/2003 | Hendrey et al. |
| 2003/0078053 A1 | 4/2003 | Abtin et al. |
| 2003/0093314 A1 | 5/2003 | Leung et al. |
| 2003/0207683 A1 | 11/2003 | Lempio et al. |
| 2003/0220835 A1 | 11/2003 | Barnes, Jr. |
| 2003/0229592 A1 | 12/2003 | Florance et al. |
| 2004/0023666 A1 | 2/2004 | Moon et al. |
| 2004/0111335 A1 | 6/2004 | Black et al. |
| 2004/0192351 A1 | 9/2004 | Duncan |
| 2004/0203561 A1 | 10/2004 | Jakubowski |
| 2004/0203879 A1 | 10/2004 | Gardner et al. |
| 2004/0203888 A1 | 10/2004 | Mikan |
| 2004/0203901 A1 | 10/2004 | Wilson et al. |
| 2004/0203922 A1 | 10/2004 | Hines et al. |
| 2005/0027437 A1 | 2/2005 | Takenaga et al. |
| 2005/0027608 A1 | 2/2005 | Wiesmuller et al. |
| 2005/0085952 A1 | 4/2005 | Park et al. |
| 2005/0096013 A1 | 5/2005 | Lehikoinen et al. |
| 2005/0096040 A1 | 5/2005 | Haberman et al. |
| 2005/0165788 A1 | 7/2005 | Yang et al. |
| 2005/0177416 A1 | 8/2005 | Linden |
| 2005/0202832 A1 | 9/2005 | Sudit |
| 2005/0227711 A1 | 10/2005 | Orwant et al. |
| 2005/0250517 A1 | 11/2005 | Fukui et al. |
| 2005/0261001 A1 | 11/2005 | Marley et al. |
| 2005/0272413 A1 | 12/2005 | Bourne |
| 2006/0020508 A1 | 1/2006 | Gorti et al. |
| 2006/0022048 A1 | 2/2006 | Johnson |
| 2006/0046744 A1 | 3/2006 | Dublish et al. |
| 2006/0116817 A1 | 6/2006 | Salmre et al. |
| 2006/0135177 A1 | 6/2006 | Winterbottom et al. |
| 2006/0218151 A1 | 9/2006 | Adelman et al. |
| 2006/0253453 A1 | 11/2006 | Chmaytelli et al. |
| 2006/0277290 A1 | 12/2006 | Shank |
| 2007/0042788 A1 | 2/2007 | Duan |
| 2007/0042789 A1 | 2/2007 | Moton et al. |
| 2007/0047479 A1 | 3/2007 | Shaffer et al. |
| 2007/0049287 A1 | 3/2007 | Dunn |
| 2007/0049288 A1 | 3/2007 | Lamprecht et al. |
| 2007/0049289 A1 | 3/2007 | Woo |
| 2007/0049292 A1 | 3/2007 | Emond |
| 2007/0049293 A1 | 3/2007 | Russell |
| 2007/0060171 A1 | 3/2007 | Sudit et al. |
| 2007/0072619 A1 | 3/2007 | Wei et al. |
| 2007/0072621 A1 | 3/2007 | Mukkavilli et al. |
| 2007/0072625 A1 | 3/2007 | Fournier et al. |
| 2007/0072626 A1 | 3/2007 | Babu et al. |
| 2007/0077939 A1 | 4/2007 | Uematsu et al. |
| 2007/0077942 A1 | 4/2007 | Heaven et al. |
| 2007/0077943 A1 | 4/2007 | Hamilla |
| 2007/0080830 A1 | 4/2007 | Sacks |
| 2007/0082668 A1 | 4/2007 | Silver et al. |
| 2007/0082680 A1 | 4/2007 | Fish |
| 2007/0082681 A1 | 4/2007 | Kim et al. |
| 2007/0082682 A1 | 4/2007 | Kim et al. |
| 2007/0091838 A1 | 4/2007 | Kobayashi et al. |
| 2007/0093257 A1 | 4/2007 | McDougall et al. |
| 2007/0096900 A1 | 5/2007 | Contractor |
| 2007/0099625 A1 | 5/2007 | Rosenfeld |
| 2007/0099627 A1 | 5/2007 | Kofol et al. |
| 2007/0105565 A1 | 5/2007 | Enzmann et al. |
| 2007/0105566 A1 | 5/2007 | Sharony et al. |
| 2007/0117571 A1 | 5/2007 | Musial |
| 2007/0117572 A1 | 5/2007 | Adam et al. |
| 2007/0117573 A1 | 5/2007 | Kennedy et al. |
| 2007/0129082 A1 | 6/2007 | Thacher |
| 2007/0129083 A1 | 6/2007 | Creamer et al. |
| 2007/0135136 A1 | 6/2007 | Ische |
| 2007/0142059 A1 | 6/2007 | Wang |
| 2007/0142060 A1 | 6/2007 | Moton et al. |
| 2007/0149208 A1 | 6/2007 | Syrbe et al. |
| 2007/0149210 A1 | 6/2007 | McKiou et al. |
| 2007/0149211 A1 | 6/2007 | Dunn et al. |

(56) References Cited

U.S. PATENT DOCUMENTS

| | | | |
|---|---|---|---|
| 2007/0149212 A1 | 6/2007 | Gupta et al. |
| 2007/0149213 A1 | 6/2007 | Lamba et al. |
| 2007/0149214 A1 | 6/2007 | Walsh et al. |
| 2007/0149216 A1 | 6/2007 | Misikangas |
| 2007/0155399 A1 | 7/2007 | Alberth et al. |
| 2007/0155400 A1 | 7/2007 | Madsen |
| 2007/0159322 A1 | 7/2007 | Campbell |
| 2007/0161381 A1 | 7/2007 | Chen et al. |
| 2007/0161382 A1 | 7/2007 | Melinger et al. |
| 2007/0161401 A1 | 7/2007 | Sheynblat |
| 2007/0162582 A1 | 7/2007 | Belali et al. |
| 2007/0167170 A1 | 7/2007 | Fitchett et al. |
| 2007/0167171 A1 | 7/2007 | Bishop |
| 2007/0168127 A1 | 7/2007 | Zaruba et al. |
| 2007/0168524 A1 | 7/2007 | Chao et al. |
| 2007/0185768 A1 | 8/2007 | Vengroff et al. |
| 2008/0071749 A1 | 3/2008 | Schloter |
| 2008/0132251 A1 | 6/2008 | Altman et al. |
| 2008/0147546 A1 | 6/2008 | Weichselbaumer et al. |
| 2008/0172173 A1 | 7/2008 | Chang et al. |
| 2008/0214161 A1 | 9/2008 | Jakl |
| 2008/0242231 A1 | 10/2008 | Gray |
| 2008/0248810 A1 | 10/2008 | Obradovich |
| 2008/0252517 A1 | 10/2008 | Fuchs et al. |
| 2008/0266324 A1 | 10/2008 | Lynch et al. |
| 2008/0288545 A1 | 11/2008 | Hegedus et al. |
| 2008/0299900 A1 | 12/2008 | Lesyna |
| 2008/0316091 A1 | 12/2008 | Wigren et al. |
| 2009/0006480 A1 | 1/2009 | Fuchs et al. |
| 2009/0009397 A1 | 1/2009 | Taylor et al. |
| 2009/0009398 A1 | 1/2009 | Taylor et al. |
| 2009/0033553 A1 | 2/2009 | Tusjimoto et al. |
| 2009/0042584 A1 | 2/2009 | Nagata et al. |
| 2009/0043491 A1 | 2/2009 | Haatainen |
| 2009/0047972 A1 | 2/2009 | Neeraj |
| 2009/0063304 A1 | 3/2009 | Meggs |
| 2009/0082024 A1 | 3/2009 | Elliott |
| 2009/0176475 A1 | 7/2009 | Salkini et al. |
| 2009/0278738 A1 | 11/2009 | Gopinath |
| 2010/0017874 A1 | 1/2010 | Piccinini et al. |
| 2010/0020776 A1 | 1/2010 | Youssef et al. |
| 2010/0280874 A1 | 11/2010 | Thorn |
| 2011/0238517 A1 | 9/2011 | Ramalingam et al. |
| 2012/0276926 A1* | 11/2012 | Pitt ............ 455/456.2 |
| 2012/0284105 A1 | 11/2012 | Li |

FOREIGN PATENT DOCUMENTS

| | | | |
|---|---|---|---|
| JP | 2003161771 A | 6/2003 |
| JP | 2003344092 A | 12/2003 |
| JP | 2005323404 A | 11/2005 |
| JP | 2007-51869 A | 12/2005 |
| KR | 10-2005-0004662 A | 1/2005 |
| KR | 10-2005-0014940 A | 5/2005 |
| KR | 10-2007-0053539 A | 5/2007 |

OTHER PUBLICATIONS

Office Action from U.S. Appl. No. 11/838,876 dated Oct. 19, 2010.
Office Action from U.S. Appl. No. 11/838,876 dated Mar. 24, 2011.
An Exploration on Mobile Social Networking: Dodgeball as a Case in Point, Nina Ziv et al., Mobile Business, 2006, ICMB '06, International Conference of IEEE Computer Society, p. 21, XP031056542, DOI: 10.1109/ICMB.2006.8, ISBN: 978-0-7695-2595-2 (Jun. 1, 2006).
"Mobile Context Inference using Low-Cost Sensors", Evan Welbourne et al., Lecture Notes in Computer Science—LNCS, Springer, DE, vol. 3479, pp. 254-263, XP007915205, ISSN: 0302-9743 (Jan. 1, 2005).
"Modular Bayesian Networks for Inferring Landmarks on Mobile Daily Life", Keum-Sung Hwang et al., AI 2006: Advances in Artificial Intelligence Lecture Notes in Computer Science, Lecture Notes in Artificial Intelligence, LNCS, Springer, Berlin, DE, pp. 929-933, XP019052024, ISBN: 978-3-540-49787-5 (Jan. 1, 2006).
"WatchMe: Communication and Awareness between members of a Closely-Knit Group", Natalia Marmasse et al., UbiComp 2004: Ubiquitous Computing: 6th International Conference, Nottingham, UK, Sep. 7-10, 2004, Lecture Notes in Computer Science, vol. 3205 (Nov. 2, 2004).
Final Office Action dated May 9, 2012, issued in U.S. Appl. No. 12/728,217.
Non-Final Office Action issued on Jul. 27, 2012, in U.S. Appl. No. 12/728,216.
Nov. 22, 2011 International Search Report and Written Opinion issued in International Application No. PCT/US2011/028734.
Extended European Search Report issued on May 29, 2012, for European Application No. 08797761.7.
Oct. 25, 2011 International Search Report and Written Opinion issued in International Application No. PCT/US2011/028566.
Office Action (Non-Final) from U.S. Appl. No. 12/728,217 dated Dec. 20, 2011.
Final Office Action issued in U.S. Appl. No. 12/728,216 on Dec. 28, 2012.
Non-Final Office Action for U.S. Appl. No. 12/728,217 dated Nov. 29, 2012.
Office Action issued in U.S. Appl. No. 13/052,193 on Jan. 2, 2013.
"CardStar iPhone App Wrangles Multiple Membership Cards," written by Dong Ngo on May 15, 2009, http://news.cnet.com/8301-17938_105-10241727-1.html (last accessed May 22, 2013).
Apple Store POS Handhelds forum posts from Sep. 25, 2008, through Sep. 28, 2013, http://www.everythingcafe.com/forum/threads,apple-store-pos-handhelds.32824 (last accessed May 22, 2013).
Final Office Action issued in U.S. Appl. No. 13/052,193 on Jun. 18, 2013.
Notice of Allowance issued in U.S. Appl. No. 12/728,216 on Mar. 15, 2013.
Office Action issued in related Japanese Patent Application No. 2010-521129 on Feb. 4, 2013. English translation provided on pp. 6-9.

* cited by examiner

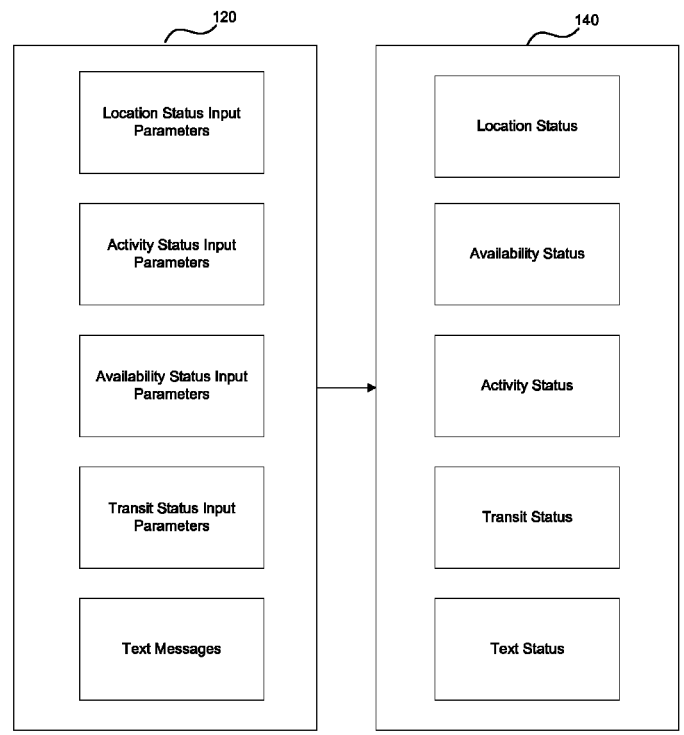

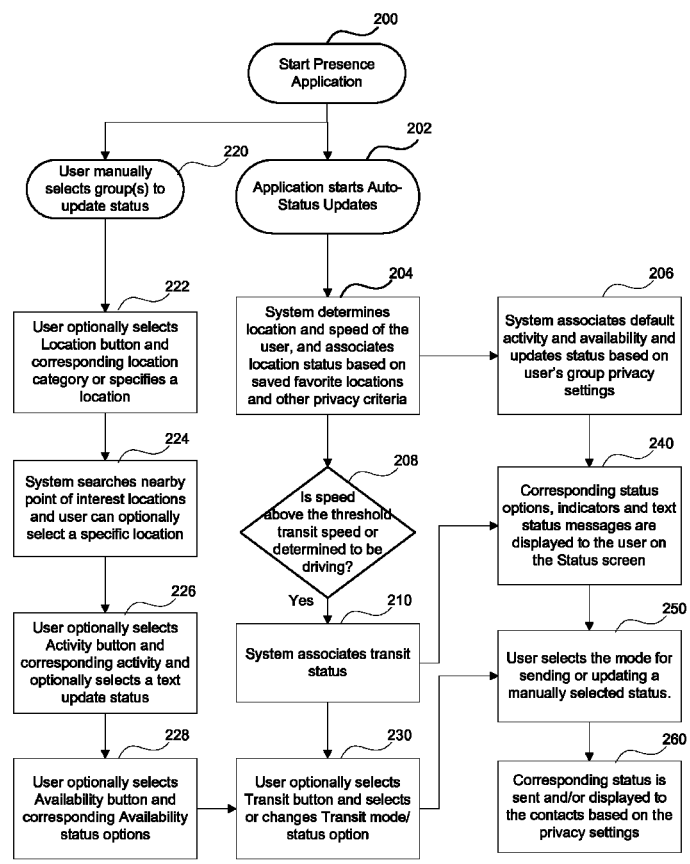

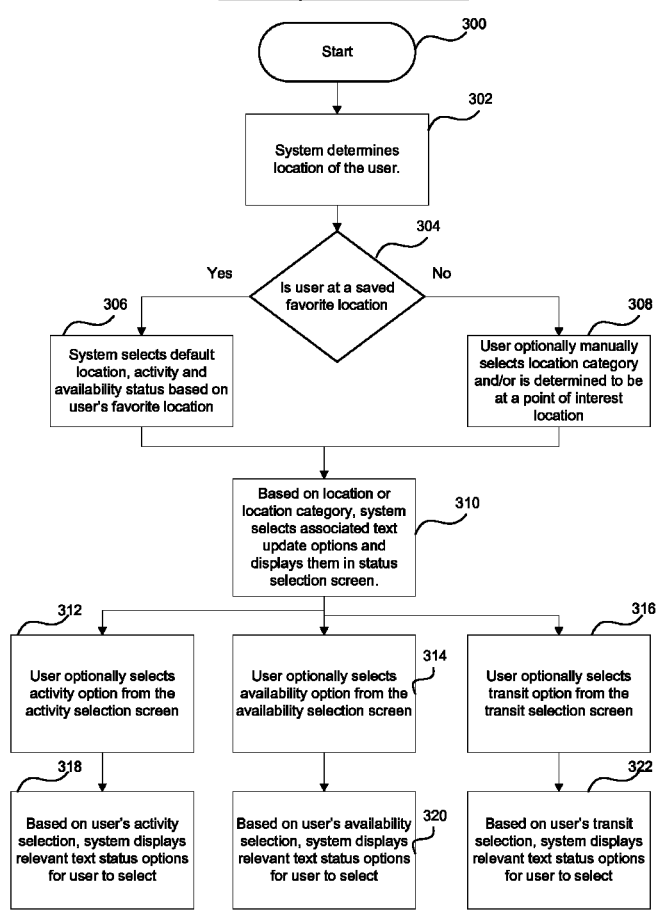

Fig 4 – System for determining frequently used text messages based on location, activity, availability or transit status selection
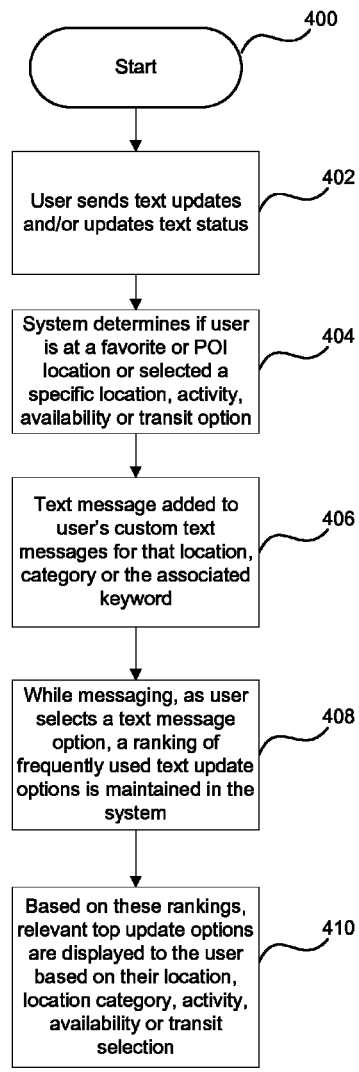

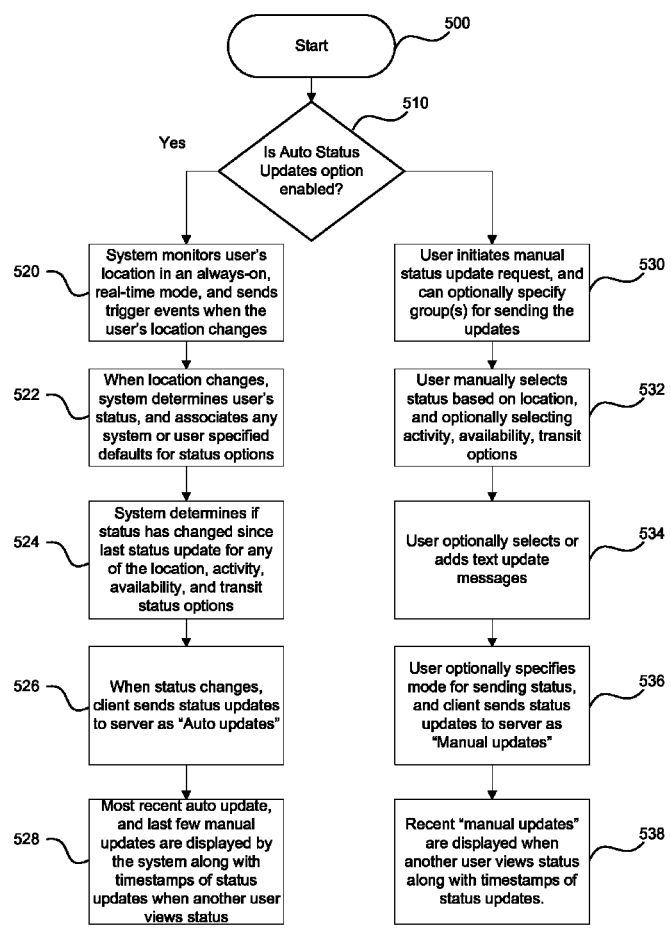

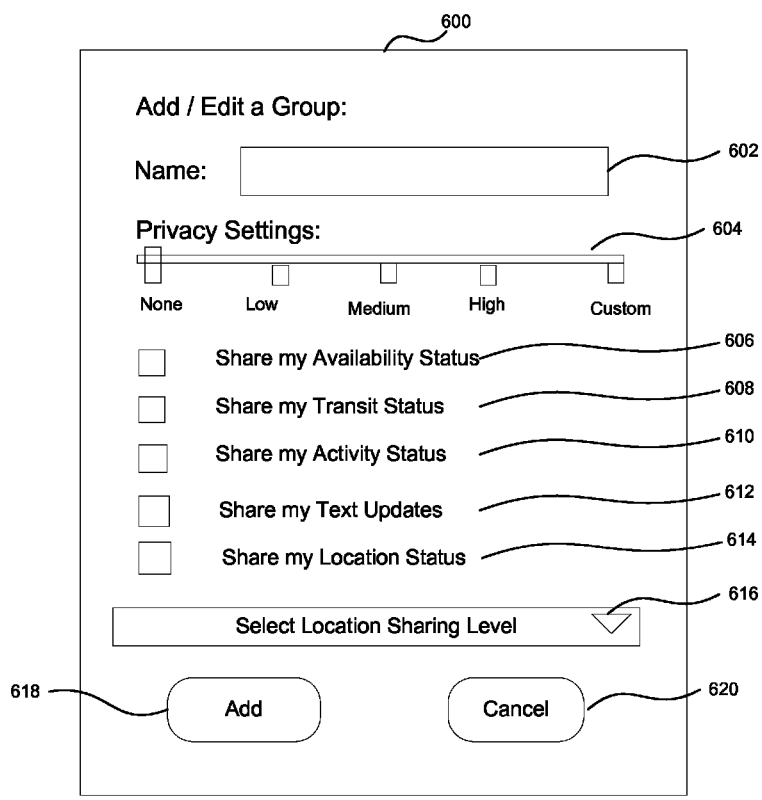
Fig 6 – Managing privacy settings by groups and privacy levels

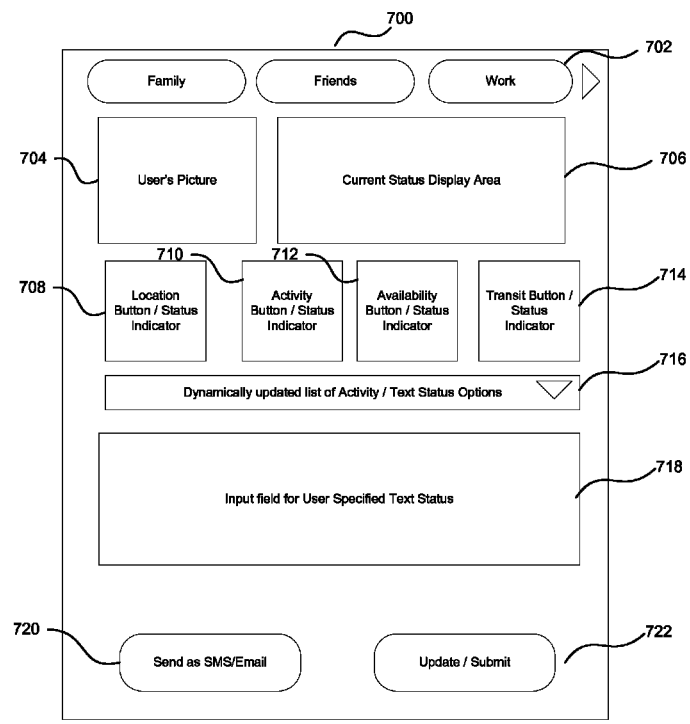
Fig 7 – Application user interface for selecting user's status

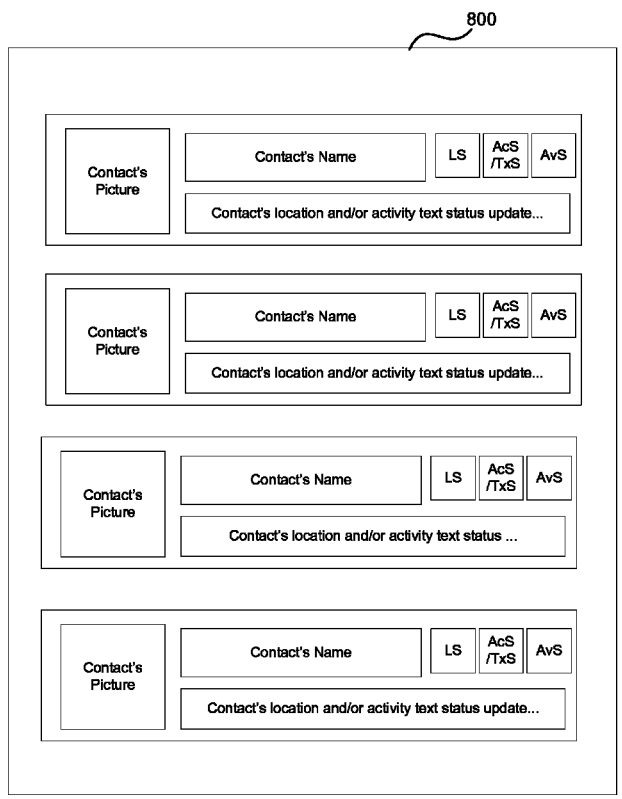
Fig 8 – Application user interface for displaying user's status

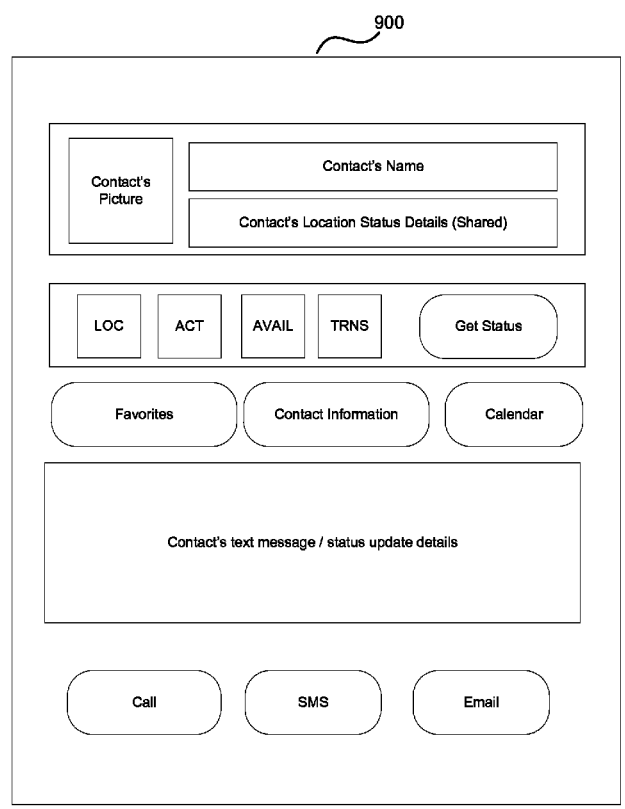
Fig 9 – Application user interface for displaying user's status details

US 8,583,079 B2

RICH PRESENCE STATUS BASED ON LOCATION, ACTIVITY, AVAILABILITY AND TRANSIT STATUS OF A USER

CROSS-REFERENCE TO RELATED APPLICATIONS

This application claims priority to U.S. Provisional Patent Application No. 61/316,242, filed on Mar. 22, 2010, which is a Continuation-In-Part of U.S. patent application Ser. No. 12/728,216 entitled "REAL-TIME LOCATION AND PRESENCE USING A PUSH-LOCATION CLIENT AND SERVER," filed on Mar. 20, 2010, which is a Continuation-In-Part of U.S. patent application Ser. No. 11/838,876 entitled "LOCATION BASED PRESENCE AND PRIVACY MANAGEMENT," filed on Aug. 14, 2007, and which are hereby incorporated by reference.

BACKGROUND

In many messaging, voice calling, and instant messaging applications, presence has been a key enabler and driver of messaging services. However, the presence status in such services has typically been limited to a user specifying their availability status by manually selecting options such as online, busy, away, etc.

Further, presence status in such services is often made accessible only to users within that service, wherein the users of the service have to be signed on and be approved by the user to be able to view their presence status.

In the mobile phone industry, presence as it has been used in the instant messaging applications has had limited usability as often users are always considered online, or in other words accessible on their mobile device. Further, a very small percentage of users are actively signed on to an instant messaging service on their mobile device at any given time.

Also due to the fragmentation in the mobile industry, extending the usability of presence in the mobile context poses a significant challenge for the industry.

Additionally, due to privacy concerns, extending a user's presence more broadly to everyone or even to all of their contacts is an issue that the industry has not been able to address.

In summary, usability of presence has been limited to desktop applications, where it is primarily integrated with instant messaging applications, and in the mobile context, usability of presence has been significantly diminished due to technological and other constraints imposed by the industry.

SUMMARY

In many instances, users are interested in selectively sharing some aspects of their location or activity status with their friends and family members, and in other scenarios, some aspects of status like transit status more broadly with everyone. In many instances, the status might be related to the location of the user, and can be determined by the mobile device.

One aspect of the invention is to create multiple types of presence status that are associated with user's location, activity, availability, and transit status, which the users can easily and selectively share on their mobile device with different groups of users, and make one or more aspects of their presence status broadly available to everyone, e.g., the transit status can be broadly shared with everyone so any calling user can be informed that the user is driving. In this system, when the users select any of the status options such as location, activity, availability, and transit, relevant status options under these categories are presented to the user to select further relevant options that may be of interest to them. Further, each of the status types have separate privacy settings that the users can specify by group of users, and these can be enabled without providing a location tracking capability to other users.

Another aspect of the invention is that the status can be determined intelligently based on the location information determined by a GPS or another mobile positioning solution, and also dynamically determined based on other information in the system such as user's favorite locations, point of interest locations, user's networks favorite locations that they have permissions to, etc.

Another aspect of the invention is the user interface for determining and sharing such status options, which will have a significant impact on the usability of presence on a mobile device due to the screen size and due to the varying capabilities of the different mobile operating systems.

Another aspect of the invention is to present the user relevant textual or graphical status options based on their location or activity, e.g. when the user is determined to be at an airport, they are dynamically presented relevant location based status options such as "I'm travelling", "Boarding", "Arrived", or "Waiting at baggage claim", etc., and when at a theater, they can select from options such as "Watching a movie", "At the Opera", etc.

Another aspect of the invention is the capability to select the relevant visual status indicators for each of the status categories that can be displayed to the user on the mobile device. In some instances, the relevant visual indicators are automatically selected based on the context of user's action or location.

Another aspect of the invention is a system to capable of managing the privacy of user's status by groups of users. By default, the system manages privacy by at least a few groups such as "family", "friends", "work", and "all", and users can create additional groups of users and associate privacy settings with each group.

BRIEF DESCRIPTION OF THE DRAWINGS

Foregoing aspects of the invention will become better understood by referring to the following description taken in conjunction with the accompanying drawings.

FIG. 1 is an overview of presence status types and dependencies.

FIG. 2 is a block diagram for determining rich presence status updates based on location, activity, availability, and transit status.

FIG. 3 is a block diagram for associating location contextual text message and status update options based on user's location, activity, availability or transit selection.

FIG. 4 is a block diagram for a system for determining frequently used text messages based on location, activity, availability or transit status selection FIG. 5 is a block diagram for a system for determining auto and manual updates based on location, activity, availability and transit status.

FIG. 6 is a block diagram for managing privacy settings by groups and privacy levels.

FIG. 7 is an overview of an exemplary application user interface for selecting user's status.

FIG. 8 is an overview of an exemplary application user interface for displaying status overview of all contacts or by a group of contacts or for contacts with recent updates.

FIG. 9 is an overview of an exemplary application user interface for displaying user's status details to other contacts, and providing options for requesting further status details, calling or messaging the user, and planning a meeting.

DETAILED DESCRIPTION

FIG. 1 provides an overview of presence status types and input parameters for determining these status options. In block 110, a number of input parameters are used to determine the status of the user. In block 112, the location input parameters are determined which include one or more of geographic coordinates, location name, location category, area name, city, state, postal code, country, and/or the favorite location identifier of user's current location. In block 114, the activity input parameters are determined which include one or more of default system-specified or user-specified activity status associated with user's favorite locations, or default activity status associated with point of interest (POI) location categories, specific POI locations, sports activity categories, travel activity categories, events categories, and/or status associated with specific events. In block 116, the availability input parameters are determined which include one or more of default system-specified or user-specified availability status associated with user's favorite locations, or default availability status associated with point of interest (POI) location categories, specific POI locations, default availability status associated with selected activity category, cell phone profile selection or other criteria (e.g., ringer on/off, battery status, phone not in coverage area, etc.), as well as status options selected on other instant messaging services. In block 118, the transit input parameters are determined which include one or more of speed of device, whether user is detected as driving using other driving detection mechanisms, specific transit-specific POI locations or categories such as a train station, a bus stop, etc., transit modes selected by the user, and/or if the user is determined to be on the favorite routes or waypoints of the user.

In block 140, the status is determined for the user based on the input parameters for each of the status categories, and the corresponding status is communicated to an application server that maintains the groups and associated privacy settings of the user.

FIG. 2 is an exemplary block diagram for determining rich presence status updates based on location, activity, availability, transit status selections, and any recent text updates. In block 200, a user starts presence application and in block 202, the application starts auto-status updates if auto-updates are enabled, wherein the application determines status updates each time a new location is detected and/or a notification of a new location is received from the location service or the push location client as applicable. Specifically, in block 204, the system determines location and speed of the user, and associates location status based on user's favorite locations and other privacy settings of the user. In block 206, the system associates user's default activity and availability status if applicable based on the location of the user. In block 208, it is determined if the speed of the mobile device is above the transit speed threshold and/or the user is detected to be driving using other driving detection methods. If yes, the system associates transit status to user's status. In block 230, the user may optionally select the mode of transit, which can be saved as the default mode of transit for the user.

Additionally, in block 220, a user may manually update status, e.g. by selecting status tab or button to go to the My Status screen, and optionally selecting the group for sharing the manual status. In block 222, user can optionally select a location category or specifies a location or point of interest. In block 224, system searches nearby point of interest locations for specified location category and/or location criteria, and user can optionally select a specific location from the search results. In block 226, user can optionally select an activity status option, and further optionally select a text update from the relevant text options. In block 228, user can optionally select an availability status option, and further optionally select a text update from the relevant text options. At any time during the manual status update selection process, user can optionally select transit status options as specified earlier in block 230. In block 240, corresponding status options, indicators, and selected text messages are displayed to the user on the status screen. In block 250, the user selects the method for updating the manually selected or specified status options, and can optionally send the status update as an SMS or an email in addition to updating the status on the application server.

FIG. 3 is a block diagram for associating location contextual text messages and status update options based on user's location, activity, availability or transit selection. In this exemplary block diagram 300, in the block 302, the system determines the location of the user, and if in the decision block 304, it is determined that the user is in a saved favorite location of the user, then in block 306, the system selects the default location, activity, and availability status options associated with the favorite location. If in the decision block 304, the user is not determined to be at a saved favorite location, in the block 308, the user may manually select a location category or select a location from search results and/or is determined to be at a point of interest location. As a result of the favorite location or a point of interest location and/or location category selection in blocks 306 or 308, in block 310, the system associates text update options specific to that location. For example, when the user is determined to be at an airport, they are dynamically presented relevant text options such as "I'm travelling", "Boarding", "Arrived", or "At baggage claim", etc. Similarly, in blocks 312, 314, and 316, the user can optionally select activity, availability, and transit status options respectively, and in corresponding blocks 318, 320, and 322, based on user's selections for activity, availability, or transit status respectively, the system displays relevant text status options for users to select for text updates and/or text messaging. For example, when the user selects Soccer as their activity, they are dynamically presented relevant text options such as "Playing Soccer", "Watching Soccer World Cup", etc. The system may determine the text options to be displayed based on the user's selection, and a system determined list of text updates based on location, and any associated activities and events at that location.

FIG. 4 is a block diagram 400 for a system for determining and providing frequently used text messages based on location, activity, availability or transit status selection. In block 402, when a user sends text updates and/or updates their text status, in block 404, the system determines if user is at a favorite or POI location, or has selected a location, activity, availability, or transit status option. In block 406, the text message is added to user's custom text messages list along with the associated location name, POI category or another keyword based on activity, availability or transit status selected or specified by the user, up to a limited number of custom text messages as specified by the system. In block 408, as the user selects custom text messages, a ranking of frequently used text updates is maintained in the system. In block 410, as the user sends text updates and/or text messages, the relevant top frequently used messages are displayed in the text message selection list based on the location, location category, activity, availability, transit selected or determined by the system.

FIG. 5 is a block diagram for a system for determining auto and manual updates. In the block 500, when the user starts the application, a default selection is made for turning the Auto Updates ON or OFF, which can be changed by the user. In the decision block 502, it is determined if the Auto Status Updates setting is ON or OFF. If enabled, in block 520, the system monitors user's location in an always-on, real-time mode, and also turns on a status monitoring thread, which is notified when the user's location changes. In block 522, when the user's location changes, it is further determined if the status of the user has changed since the last status update was sent to the server. The system checks if the status has changed for any of the status options, including location, activity, availability, transit or text status options. When the status has changed, the client sends a status update to the server, with the associated Status Update Type marked as Auto Status. However, if Auto Status Updates option is turned OFF, no auto-updates are sent, and the user can manually update the status as appropriate.

Additionally, at any time, in block 530, the user can manually initiate an update request for their status, and can specify groups for updating the status. In such a case, in block 532, the user manually selects status based on location, and optionally selects activity, availability, transit status options. Further, in block 534, user optionally selects or adds text message updates. In block 536, user can optionally specify if they want to update the status with the server, or send the status update as an SMS or Email. The mobile client accordingly sends the status updates, and also updates the server with the Status Update Type marked as Manual update. In such a case, when a contact views the user's status, in block 538, the system determines the most recent manual status messages accessible by the contact, and displays them along with a timestamp. Using such a system of Auto and Manual status updates, the most recent status update of the user is available to the contacts of the user, and most recent Auto Updates can be displayed along with most recent Manual Updates and a most recent status context is maintained regardless of the different frequencies of such updates.

FIG. 6 is an exemplary user interface 600 and provides an overview of how to manage privacy settings associated with the status options by groups and privacy levels. In the element 602, the name of the group is displayed or an option is presented to select or specify the group. In the element 604, an option to select a privacy level is presented. This can be in the form or a slider or a drop down menu. By selecting from a list of easy to understand options such as None, Low, Medium, High and Custom, the privacy settings for the different status elements 606, 608, 610, 612, 614, and for location sharing levels in element 616 can be updated by default. Additionally, a default set of group options such as Family, Friends, Work, Others can be pre-configured on a mobile device with different privacy levels. This provides the user an option to get a good out of the box experience, and the option to change any of the privacy settings for one or more group as per their individual privacy preferences.

FIG. 7 is an overview of an exemplary application user interface 700 for displaying and selecting user's status by group. Elements in the row 702 correspond with the groups of the user, and can be selected to see the corresponding status update available to the contacts in each group, while also providing a interface for group text messaging. The elements 704 and 706 display the picture and status available to the group, and button elements 708, 710, 712, 714 are selection start buttons for location, activity, availability, and transit status. Element 716 displays the text message options that the user can select to update their status, and a dynamically updated list of text messages can be displayed using a drop down or similar element. Element 718 is the input area for the user to provide a custom text message. Element 720 element can be a button or dropdown to select the mode of sending status, such as options to Update Only, Send As SMS, or Send As Email. Element 722 is to manually update the status after the user has selected the corresponding status options.

FIG. 8 is an overview of an exemplary application user interface 800 for displaying status overview of all contacts or by a group of contacts or for contacts with recent updates. For each contact, a row of their image, name, and current or most recent status update is included. Multiple rows for status updates may be included, and prioritized based on information available in the location, activity, availability, transit, or text status elements. Location status is provided if available. In a second row, transit status, activity, and availability are presented in an order of priority, such that if transit status is available, it takes precedence over activity and availability, and activity takes precedence over availability. Finally, most recent text update can be presented if shared with the contact. Upon selecting the row, the contact can see a more detailed Contacts screen, such as the one presented in the illustration 900.

FIG. 9 is an overview of an exemplary application user interface 900 for a detailed Contacts screen, displaying user's status details to other contacts, and providing options for viewing the contacts favorite locations shared by the user, requesting further status details, calling or messaging the user, and/or viewing any published calendar information for purposes of planning a meeting. The contact's most recent status updates or status history is also included in this interface.

I claim:

1. A system, comprising:
at least one mobile device configured to determine input parameters associated with one or more of location, activity, availability, and transit status of a user; and
at least one application server configured to maintain privacy settings of the user, wherein
the at least one application server is configured to determine a status of the user based on the input parameters,
the rich presence status can be determined based on one or more of location, activity, availability, and transit status of the user, and
the at least one mobile device is configured to display a user interface with options to manage privacy settings for groups of users, to receive user selections of the privacy settings for the groups of users, and to transmit the privacy settings for the groups of users to the at least one application server.

2. The system of claim 1, wherein the at least one application server is further configured to maintain the groups and associated privacy settings of the user.

3. The system of claim 1, wherein the at least one application server is further configured to maintain privacy levels associated with the groups of the user, contacts of the user, or the groups of the user and the contacts of the user to determine what status is available to a contact.

4. The system of claim 1, wherein the at least one mobile device is configured to determine and provide relevant textual status options based on the location or activity of the user.

5. The system of claim 1, wherein the mobile device is further configured to send the user's status as text messages to the groups of users.

6. The system of claim 1, wherein the application server is further configured to combine a most recent auto status update with recent manual status updates selected by the user.

7. A method, comprising:
   determining, by a mobile device, the input parameters associated with one or more of location, activity, availability, and transit status of a user;
   sending, by the mobile device, the input parameters to an application server;
   determining, by the application server, relevant text status messages corresponding to the one or more of the location, activity, availability, and transit status of the user;
   displaying, by the mobile device, a user interface with options to manage privacy settings for groups of contacts or applications;
   receiving, by the mobile device, user selections of the privacy settings for the groups of contacts or applications;
   transmitting, by the mobile device the privacy settings for the groups of contacts to the application server;
   associating, by the application server, privacy settings associated with groups of contacts or applications; and
   sending, by the application server, the text messages to the contacts or applications based on the associated privacy settings.

8. The method of claim 7, wherein the mobile device, the application server, or both are configured to associate user-specified defaults for status associated with specified geographic locations of the user.

9. The method of claim 7, wherein the mobile device, the application server, or both are configured to associate system-specified defaults for point of location categories, or the specific points of locations.

10. The method of claim 7, further comprising:
   combining, by the application server, a most recent auto status update with recent manual status updates selected by the user.

11. A method, comprising:
   displaying, by a mobile device, a user interface with options to manage privacy settings for groups of users or other applications;
   receiving, by the mobile device, user selections of the privacy settings for the groups of users or other applications; and
   transmitting, by the mobile device, the privacy settings for the groups of users or other applications to at least one application server, wherein
   status information pertaining to the mobile device that is shared with each group of users or applications is based on a respective privacy level for the group, and
   the mobile device is configured to display a user interface with options to manage privacy settings for groups of users, to receive user selections of the privacy settings for the groups of users, and to transmit the privacy settings for the groups of users to the at least one application server.

12. The method of claim 11, further comprising:
   maintaining, by an application server, the groups of users and associated privacy settings of a user of the mobile device.

13. The method of claim 11, further comprising:
   maintaining, by an application server, privacy levels associated with the groups of users, contacts of a user, or the groups of the users and the contacts of the user of the mobile device.

14. The method of claim 11, further comprising:
   determining and providing, by the mobile device, relevant textual status options based on one or more of location, activity, availability, or transit status of a user of the mobile device.

15. The method of claim 11, wherein the mobile device is further configured to send the user's status as text messages to the groups of users.

16. The method of claim 11, further comprising:
   associating, by the mobile device, an application server, or both, user-specified defaults for status options associated with favorite locations of the user.

17. The method of claim 11, further comprising:
   associating, by the mobile device, the application server, or both, system-specified defaults for point of location categories, specific points of locations, or the point of the location categories and the specific points of the locations.

18. A method, comprising:
   determining, by an application server, relevant text messages associated with one or more of location, activity, availability, and transit status of a user;
   sending the relevant text messages, by the application server, to a mobile device of a user;
   displaying, by the mobile device, the relevant text messages to the user for selection; and
   sending the selected text message, by the mobile device, to the application server, wherein
   the mobile device is configured to display a user interface with options to manage privacy settings for groups of users, to receive user selections of the privacy settings for the groups of users, and to transmit the privacy settings for the groups of users to the application server.

19. The method of claim 18, further comprising:
   displaying, by the mobile device, a user interface with options to manage privacy settings for sharing selected text messages with groups of contacts or applications;
   receiving, by the mobile device, user selections of the privacy settings for the groups of contacts or applications;
   transmitting, by the mobile device, the privacy settings for the groups of contacts or applications to the application server;
   associating, by the application server, privacy settings associated with groups of contacts or applications; and
   sending, by the application server, the text messages to the contacts or applications based on the associated privacy settings.

20. The method of claim 18, further comprising:
   combining, by the application server, a most recent auto status update with recent manual status updates selected by the user.

* * * * *